H. L. & H. J. FERRIS.
CALF PEN.
APPLICATION FILED APR. 6, 1914.
1,128,769.
Patented Feb. 16, 1915.
2 SHEETS—SHEET 1.
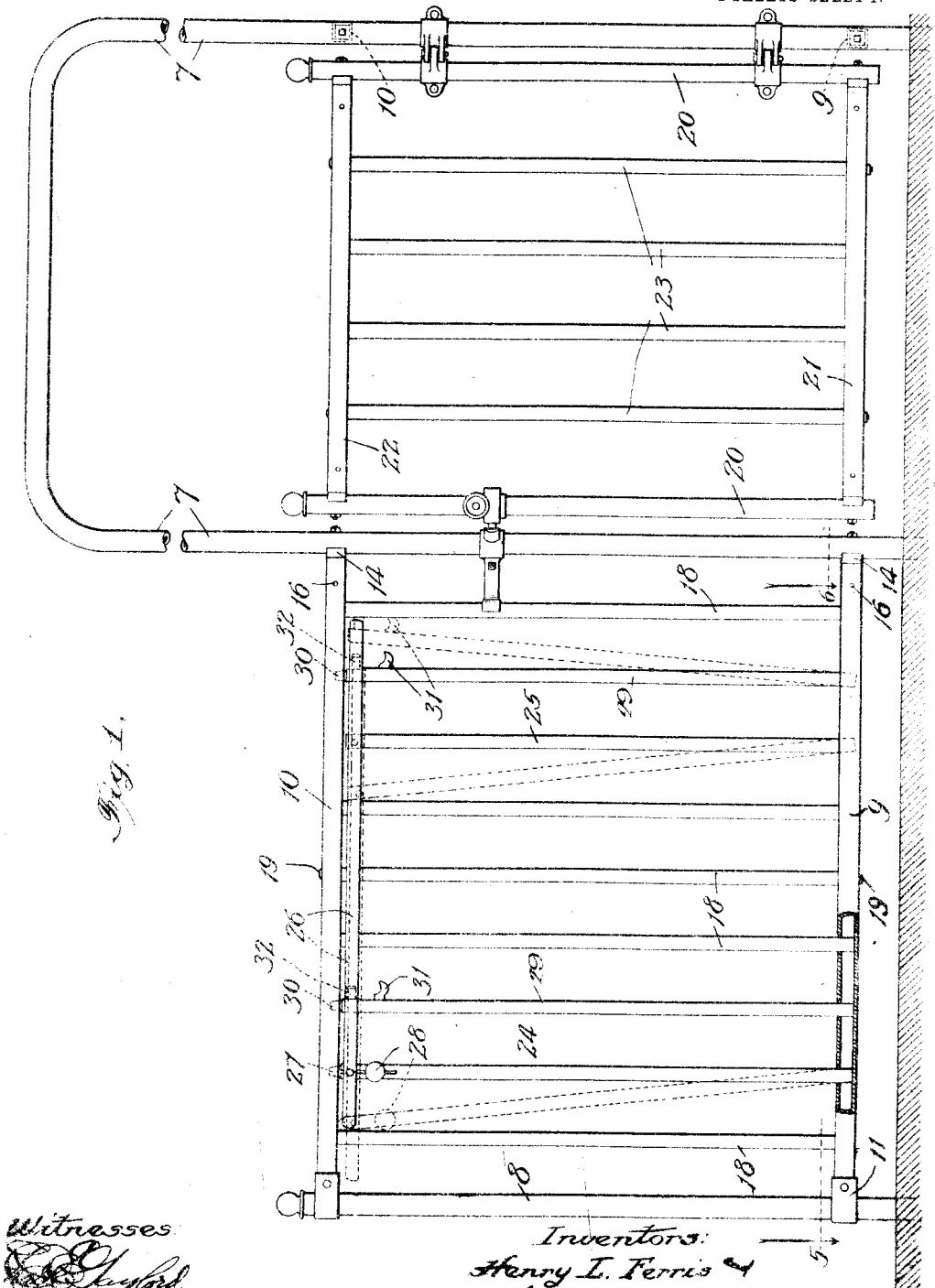

H. L. & H. J. FERRIS.
CALF PEN.
APPLICATION FILED APR. 6, 1914.
1,128,769.
Patented Feb. 16, 1915.
2 SHEETS—SHEET 2.
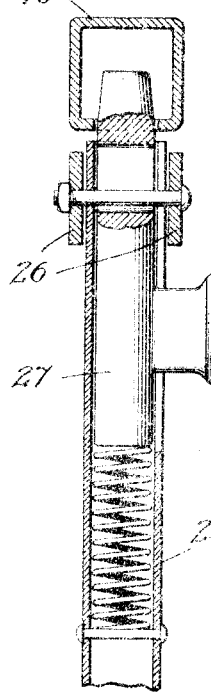
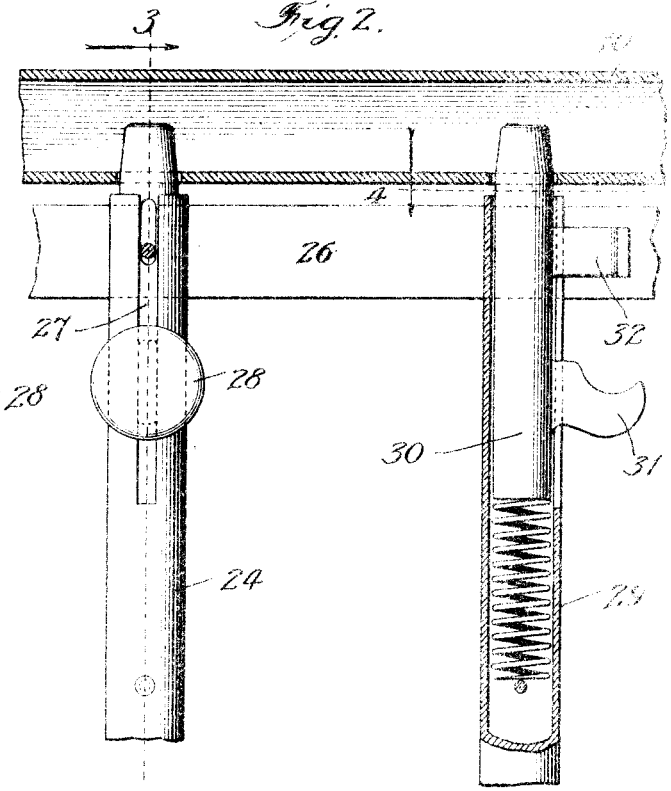
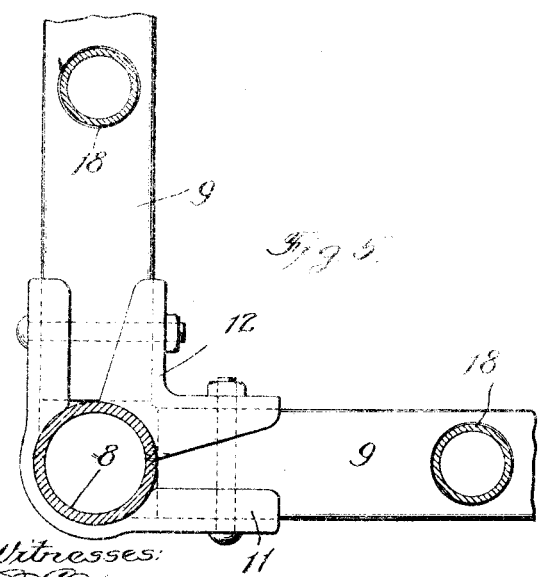
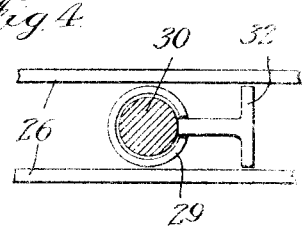
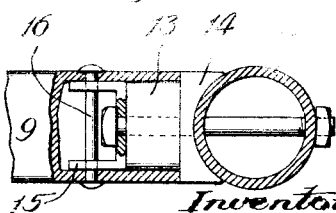
Witnesses:
Inventor:
Henry L. Ferris and
Howard J. Ferris,
By Dyrenforth, Lee, Chritton & Wiles
Attys.

UNITED STATES PATENT OFFICE.

HENRY L. FERRIS AND HOWARD J. FERRIS, OF HARVARD, ILLINOIS, ASSIGNORS TO HUNT, HELM, FERRIS & COMPANY, OF HARVARD, ILLINOIS, A CORPORATION OF ILLINOIS.

CALF-PEN.

1,128,769.   Specification of Letters Patent.   Patented Feb. 16, 1915.

Application filed April 6, 1914. Serial No. 829,932.

*To all whom it may concern:*

Be it known that we, HENRY L. FERRIS and HOWARD J. FERRIS, citizens of the United States, residing at Harvard, in the county of McHenry and State of Illinois, have invented a new and useful Improvement in Calf-Pens, of which the following is a specification.

Our invention relates to certain new and useful improvements in calf-pens and is fully described and explained in the specification and shown in the accompanying drawings, in which:

Figure 1 is an elevation of the front of our improved pen; Fig. 2 is a vertical section showing the structure of the upper parts of the movable bars forming the stanchion; Fig. 3 is a section on the line 3 of Fig. 2; Fig. 4 is a section on the line 4 of Fig. 2; Fig. 5 is a section on the line 5 of Fig. 1, and Fig. 6 is a section on the line 6 of Fig. 1.

It will be understood that in building calf pens, it is most common to adopt a square or rectangular form and that those movable bars of the fence structure which form between them the stanchion for confining the calves are customarily placed only on one side, and the gate is usually placed as well on that side. We have therefore deemed it unnecessary to show more than the single side of the inclosure for the other sides are made as usual, or similar thereto, except all of the vertical bars are rigid and immovable.

In the drawings, 7 is a U-shaped member set in the barn floor and forming the gate inclosure. It is preferably made of round pipe. 8 is a corner post, similar posts being placed at the two rear corners of the inclosure. Between the member 7 and corner post 8 and at the front of the pen (and in corresponding positions on the other sides of the inclosure) are top and bottom horizontal members 9 and 10 of tubing square in cross-section. While various expedients may be adopted for securing these parts together, we have shown in Figs. 5 and 6 the preferred constructions. The corner post has on its opposite sides two clamping-members 11 and 12, which embrace it as shown in Fig. 5 and are provided with parts to embrace the square tube, bolts being passed through to hold the parts tightly together. To fit the square horizontal members to the member 7, the construction of Fig. 6 is adopted. The square tube has fitted into its end a saddle 13 having a curved end 14 to fit the member 7. Within the tube is a clip 15 pinned thereto by a pin 16 through which clip passes a bolt 17 to draw the square tube firmly toward the member 7. The structure of Fig. 5 is preferably adopted at the rear corners of the pen, and that of Fig. 6 where the side joins the right-hand leg of the member 7. Extending vertically between the bottom and top members of the pen are stationary vertical members 18. These members are simply round tubes passed through perforations in the adjacent faces of the top and bottom members and confined between the opposite faces thereof, as shown in Fig. 1.

The structure is held firmly together by bolts passed vertically through certain of the vertical members 18 at such intervals as may be necessary for strength. The ends of one of these bolts are shown at 19 in Fig. 1. By this arrangement, an exceedingly simple and cheap pen construction is obtained. The panels on the several sides are strong and rigid and the greatest simplicity is attained, and it may be added that the structure is of a character which can readily be washed and therefore lends itself to modern sanitary requirements. It will be understood that under ordinary conditions, the three sides of the pen, not shown, will be built exactly as so far described, and all of the vertical members thereof will be of the rigid type and similar to those designated 18. The gate panel shown to the right of Fig. 1 is assembled in the same general manner. 20 are the side-bars of the gate, one being hinged to one side of the gate frame and the other provided with the usual latch. 21 and 22 are the bottom and top members of the gate and 23 the vertical members thereof, all assembled as so far described, the connections between the bottom and top members and the side-bars being similar to that shown in Fig. 6.

In devices of this character, it is desirable to provide, in addition to the rigid vertical members, other members which can be separated and brought together to provide stanchions through which the animals within the pen may pass their heads to reach food without. Since in practice the stanchions are placed in a series so that a number of animals enter simultaneously, it is desirable to have means for operating all the stanchions together. It is also desirable to operate any one of the stanchions alone and independent of the others of the series. We accomplish this result by making both sides of each stanchion movable and permanently connecting one side of each stanchion for movement in unison, while leaving the other side of each stanchion to be moved independently. In the present structure, there are shown only two stanchions, but it will be understood that any number can be used, and the structure illustrated fully demonstrates the principle of operation.

24 and 25 indicate the vertical bars which are movable in unison. The lower ends of these bars are mounted exactly as are the bars 18, but they are short enough just to clear the upper horizontal member 10. The lost motion which they have in their sockets is just sufficient so that their upper ends can swing the requisite distance. In practice, this swing is five inches while the bar is forty inches high. The stanchion members 24 and 25, which swing in unison, are pivoted between longitudinal operating-bars 26, one on each side thereof as shown in Fig. 3. The vertical member 24 is provided at its upper end with a spring-pressed pin 27 and an operating-handle 28 passing through a slot in the member 24. The pin 27 can enter a corresponding perforation in the upper horizontal member 10 of the pen to hold the members 24 and 25 in closed position. Thus in an obvious manner all the stanchions can be opened and closed together.

The separately movable stanchion members are indicated at 29. Each has in its upper end a spring-pressed pin 30 to engage a corresponding perforation in the top horizontal member of the pen and provided with an operating-handle 31 and with a guiding-lug 32, lying between the bars 26 to prevent rotation of the stanchion members 29. Any one of the stanchions can thus be opened by swinging the member 29.

By the arrangement here shown, an exceedingly simple structure is attained. All hinges, from the stanchion members, and all adjustable clamps such as have been common, are obviated. All the desired results are, however, attained with the minimum of parts and the least possible assembling expense, and yet the parts are so related that a proper guiding of the movable parts is secured. The stanchion sides which swing in unison are held in the plane of the panel, because the bars 26 which are attached thereto receive guidance from the stationary bars. The stanchion members 29 which move independently are guides between the bars 26.

We realize that considerable variation is possible in the details of the construction herein shown, and we do not intend to limit ourselves thereto, except as pointed out in the following claims, in which it is our intention to claim all the novelty inherent in the device as broadly as is permitted by the state of the art.

We claim as new and desire to secure by Letters Patent:

1. In a pen, top and bottom horizontal members perforated on their adjacent sides, and vertical members loosely set in said perforations, the lower ends of said vertical members resting on the lower wall of the bottom horizontal member.

2. In a pen, top and bottom horizontal members perforated on their adjacent faces, certain vertical tubes loosely set in said perforations, the lower ends of said tubes resting on the lower wall of the bottom horizontal member, and bolts passed through certain of the tubes to hold the structure together.

3. A pen comprising posts, top and bottom horizontal members connecting the same and formed of hollow tubing rectangular in cross-section, perforations in the adjacent faces of the top and bottom tubes, and vertical tubes set in said perforations, the lower ends of said vertical members resting on the lower wall of the bottom horizontal member.

4. A pen comprising posts, top and bottom horizontal members connecting the same and formed of hollow tubing rectangular in cross-section, perforations in the adjacent faces of the top and bottom tubes, and vertical tubes set in said perforations, certain of the vertical tubes terminating short of the top member and being free to swing laterally, the lower ends of all of said vertical tubes resting on the lower wall of the bottom horizontal member, and means carried by said swinging members to hold them from movement for the purpose set forth.

5. A pen comprising top and bottom tubes, rectangular in cross-section and perforated on their adjacent faces, stationary vertical tubes set in said perforations, vertical tubes set in the perforations of the lower tube, bars connecting them together and guided on the stationary tubes, whereby to move them in unison, and other vertical tubes provided with independent means at their upper ends for engaging them with the top tube, for the purpose set forth.

In testimony whereof, we have hereunto set our hands this 2nd day of April, 1914.

HENRY L. FERRIS.
HOWARD J. FERRIS.

In the presence of two subscribing witnesses:

WAYNE J. DE GROAT,
A. LEADBETTER.